United States Patent Office 2,905,567
Patented Sept. 22, 1959

2,905,567

SILICA COMPOSITION AND PRODUCTION THEREOF

Edward M. Allen, Doylestown, Ohio, assignor to Columbia-Southern Chemical Corporation, Allegheny County, Pa., a corporation of Delaware No Drawing. Application October 18, 1956
Serial No. 616,596

8 Claims. (Cl. 106—304)

This invention relates to a finely divided, siliceous pigment which is useful for reinforcement of rubber and which also is useful in other fields. Prior to the present invention, it was known that silica could be prepared by reaction of alkali metal silicate with acids. This has been a well known method of producing silica in a highly adsorptive form which is useful in adsorption and in numerous catalytic processes. Such silica is a comparatively hard product even when finely divided, and is extremely porous. It is commonly recognized in the art as a "gel."

The production of finely divided silica in a form suitable for use as a rubber reinforcing pigment has been considered desirable for many years, and a number of processes of producing silica for this purpose have been suggested. Perhaps the best silica composition which has been investigated for this purpose is silica which has been prepared by decomposition or oxidation of a vaporized silicon-containing composition, such as ethyl silicate or silicon tetrachloride. However, the silica products obtained in this manner are so expensive that they have never achieved significant commercial success except for certain specialized applications.

Attempts to prepare finely divided silica by precipitation processes from sodium silicate have, in general, resulted in the production either of unduly coarse products or the gels referred to above. Neither of these products satisfactorily reinforces rubber although they may be used as fillers or extenders.

This new pigment which has been provided according to this invention is one which comprises finely divided, precipitated, hydrated, porous, siliceous flocs and which contains in excess of 90 percent $SiO_2$ on a completely water-free basis (on a basis excluding bound and free water) and a small amount of aluminum and/or iron in the range of one mole of said metals, or either of them, to about 40 to 350 moles of $SiO_2$. These metals are present in the oxide form, usually appearing on analysis as $Al_2O_3$ or $Fe_2O_3$, possibly in chemical association with some or all of the silica, and the percentage concentration normally ranges from 0.5 to 6 percent. The pigment also contains 3 to 85 moles of silica ($SiO_2$), (usually about 6 moles), per mole of bound water, and about 2 to 10 percent by weight of free water. The surface area is about 75 to 200 square meters per gram, preferably in the range of 90 to 180 square meters per gram, and the average ultimate particle size of the product is about 0.015 to 0.05 micron, pigment of best rubber reinforcing properties being on the average of about 0.015 to 0.03 micron. Preferably, the amount of alkaline $Na_2O$ in the pigment should be less than 1.75 percent and the pigment may even be free of alkaline $Na_2O$. Small amounts of other metals may or may not be present.

The presence of iron and/or aluminum appears to impart certain advantages. The pigment settles rapidly and thus can be recovered at low cost from aqueous media. It is relatively safe from a toxicity standpoint. These and other advantages accrue at least partially because of the presence of these metals. Preferably, the silica should contain aluminum rather than iron because of the tendency of iron to impart color to the pigment.

The above described silica compositions are useful reinforcing pigments in various rubber compositions including natural rubber and synthetic rubber compositions including butadiene 1,3-styrene copolymers, butadiene-acrylonitrile copolymers, butadiene-isobutylene copolymers (Butyl rubber) and like synthetic elastomers which are derived from polymerization of butadiene, 2 chlorobutadiene-1,3, isoprene, ethylene or the like alone or with other polymerizable materials including styrene, methyl methacrylate, methyl chloroacrylate, acrylonitrile, vinyl chloride and their equivalents.

Approximately 5 to 100 parts by weight of silica is incorporated per 100 parts by weight of the rubber. Best results are obtained when the 40 to 80 parts by weight of the silica is used per 100 parts of rubber. The rubber composition contains other conventional components such as accelerators and modifying agents such as listed in some of the above examples. Temperatures of cure and methods of vulcanizing or milling these compositions are conventional and well understood in the art.

The problem of preparing a precipitated pigment of the type herein contemplated is quite difficult. It is believed that none of the processes which are disclosed by the prior art produce a pigment of the type which has been provided according to the present invention.

The various factors which have been set forth above appear to be of considerable importance in the provision of a pigment which will effectively reinforce rubber, including synthetic rubbers. The silica concentration of the pigment should be high and should exceed 90 percent by weight, frequently being as high as 94 percent by weight or even higher, on the anhydrous basis.

Two types of water are present in my novel pigment. These types are termed "bound water" and "free water." The term "free water," as used herein, is intended to denote the water which may be removed from the silica pigment by heating the pigment at a temperature of 105° C. for a period of 24 hours in a laboratory oven. The term "bound water," as used herein, is intended to mean the amount of water which is driven off from a silica pigment by heating the pigment at ignition temperature, for example, 1000 to 1200° C., until no further water can be removed, minus the amount of free water in the pigment.

It has been found, according to the present invention, that the presence of free water is advantageous. That is, pigments which do not contain free water produce rubber compositions which cure relatively slowly unless special additives, such as ethylene glycol, are introduced into the composition.

It will be understood that the amount of water remaining in a precipitated pigment depends upon the time, temperature, and other conditions of drying. Thus, it is not possible to express the conditions which will be required for drying a particular pigment with any degree of exactness. This, of course, will vary to a large degree, depending upon the degree of air circulating through the pigment, the type of drying apparatus, and the like. There appears to be a material difference in the manner in which free water and bound water are held in the molecule. The bound water appears to be chemically combined with the silica particle. For this reason, the bound water does not come off readily unless dried at temperatures above 350° C. On the other hand, the free water comes off readily upon drying at normal temperatures. Some portion of this water will be picked up on standing in atmospheric air of normal humidification. When bound water is removed, only a small portion thereof is reabsorbed on standing.

The pigments herein contemplated may be prepared by a large number of methods. A particularly effective method of preparing the silica pigment herein contemplated involves reaction of finely divided alkaline earth metal silicate, such as calcium silicate, with an acid which forms a water soluble salt with the alkaline earth metal. This alkaline earth metal silicate should have an average ultimate particle size of about 0.015 to 0.06 micron and should contain aluminum and/or iron in an amount up to about 5 percent by weight.

In the practice of this process, the acid is reacted with the calcium silicate in an amount sufficient to decompose most of the calcium silicate. However, in order to avoid complete extraction of the iron and aluminum, the pH of the ultimate slurry should be maintained above 5, usually in the range of 7 to 9. Also, to avoid contamination of the pigment with silica of inferior reinforcing properties, the alkaline earth metal silicate should not contain more than about 5 to 10 percent by weight of alkali metal silicate.

Following this, the pigment is recovered by settling and/or filtration. Thereafter, the pigment is dried.

In general, the alkali is added to the precipitated silica before the silica is completely separated from its mother liquor, which contains dissolved calcium chloride or like calcium salt. Thus, the process normally is conducted by adding acid to a slurry or suspension of the calcium silicate until the pH thereof is reduced to 5 or below and thereafter alkali, such as sodium hydroxide or like alkali metal hydroxide, is added to the resulting slurry. As a consequence, the silica contains an appreciable amount, usually 1 to 5 percent by weight of CaO. After the adjustment of the slurry is effected, the silica is recovered.

In drying the pigment, care is exerted to avoid dehydration of the pigment to the point where all of the free water, as herein defined, is removed. Hence, the drying operation normally is discontinued while a substantial quantity of free water remains. The preferred ranges are as specified above. To effect this result, the temperature of drying should neither be too high nor too low. Furthermore, drying should not be continued over an excessively long period. In general, the temperature of drying will range between 100–200° C., usually in the range of about 120–140° C. The time of drying, of course, will depend upon the amount of water entrapped in the pigment and the amount of air circulating through or over the pigment. Periods of time ranging from 10 to 12 hours normally are satisfactory when the drying temperature is within the range of 120–140° C., and the drying is conducted in a stationary shelf dryer or air-circulating oven. Shorter or longer times may be necessary if the temperature of heating becomes higher or lower, or if other drying equipment is used.

In order to obtain a product which has maximum pigmentary reinforcing characteristics when used in rubber compositions, it is necessary to use a special form of calcium silicate or similar alkaline earth metal silicate. That is, some calcium silicates will not produce the results desired. In general, in order to obtain a proper pigment of the desired particle size from calcium silicate, it is necessary to use a precipitated calcium silicate having a surface area of 50 to 125 square meters per gram and an average ultimate particle size below 0.1 micron, usually 0.03 to 0.06 micron.

The manner in which the calcium silicate has been prepared has a definite influence upon the character of the silica which is obtained therefrom. Thus, it has been found that tensile tests of rubber compositions containing silica obtained from calcium silicate prepared by reaction of calcium acetate with sodium silicate were lower than those prepared as hereinafter described, either because they cured with extreme slowness or for other reasons.

The best silica which has been prepared from calcium silicate has been obtained when the calcium silicate has been prepared by reacting calcium chloride with alkali metal silicate, containing up to 5 percent by weight of iron and/or aluminum, in aqueous medium containing sodium chloride or like alkali metal chloride. Particular details for effecting such reaction and producing calcium silicate are described in my United States Letters Patent, 2,805,955, beginning with line 5 of column 4, through line 72 of column 5.

The resulting silica is a dry powder which is found to be in an extremely fine state of division and is preponderantly silica. By analysis, the dried product normally contains above 75 percent $SiO_2$, the usual range being about 78 to 88 percent $SiO_2$.

On the anhydrous basis, the silica concentration of the product is above 90 percent, usually being in excess of about 95 percent. The surface area of this product ranges between 75 and 125 square meters per gram as measured by the Brunauer-Emmett-Teller method of determining surface area.

The pigment contains approximately 10 to 15 percent water. A free water content normally ranges between 2 to 10 percent, the balance being bound water.

The pigment prepared according to this method normally contains an appreciable concentration of calcium. This calcium content usually ranges between ½ to 6 percent, computed as calcium oxide. The pigment also contains iron and aluminum due to the presence of these materials in the sodium silicate used according to this invention. These materials were present in the sodium silicate used according to the process described in the ensuing example and thus the pigment normally contains 0.1 to 2 percent of iron and aluminum oxides.

The following are typical analyses of silica samples made from various runs in which calcium silicate prepared as described above are reacted with hydrochloric acid as above described.

TABLE I

| Sample No. | $SiO_2$ | $R_2O_3$ (Aluminum and iron oxide) | CaO | Cl | $H_2O$ |
| --- | --- | --- | --- | --- | --- |
| 1 | 82.3 | 1.30 | 1.40 | 0.21 | 15 |
| 2 | 86.5 | 0.73 | 1.18 | | 11.6 |
| 3 | 79.77 | 1.16 | 2.54 | 0.89 | 15.6 |
| 4 | 79.9 | 2.2 | 3.0 | 0.37 | 14.5 |
| 5 | 83.99 | 0.80 | 1.31 | 0.47 | 14.4 |

Percentages in the above table are by weight.

The acid used to effect the neutralization or decomposition of calcium silicate normally is hydrochloric acid. On the other hand, other acids which form water soluble anions with calcium may be used. Such acids include hypochlorous acid, hydrobromic acid, nitric acid, nitrous acid, and acetic acid. The following is an example of this process:

EXAMPLE I

Streams of aqueous sodium silicate, containing a small amount of iron and aluminum and 100 grams per liter of $SiO_2$ as $Na_2O(SiO_2)_{3.36}$, and calcium chloride solution containing 100 grams per liter of $CaCl_2$ and 30 to 40 grams per liter of sodium chloride were fed directly into the central area of a centrifugal pump at 150° F.

The rates of flow were adjusted so that calcium chloride was approximately 10 percent in excess over the stoichiometric quantity required for reaction, and so that the amount of liquid supplied to the pump was about 25 percent below the output capacity of the pump. In consequence, the solutions were subjected to turbulent intermixing in the pump.

The slurry of calcium silicate thus produced was introduced into a tank and sufficient hydrochloric acid solution containing 28 percent by weight of HCl was added, with stirring, to reduce the pH of the slurry to 2. Thereupon, sufficient sodium hydroxide solution containing 40 percent by weight of NaOH was added to raise the pH of the slurry to 7.5. The precipitated silica was recovered by decantation and filtration, and was dried in an oven at a drying temperature of 120 to 140° C. for 12 hours. The free water content of the product was within the range of 3 to 8 percent by weight of the pigment.

It will be noted that the silica pigments may be prepared from materials other than calcium silicate. Thus, finely divided precipitated magnesium silicate, barium silicate or strontium silicate, as well as silicates of zinc and other metals of series 3 to 8, group II of the periodic table, which have the surface area properties roughly approximating those set forth with respect to calcium silicate, may be subjected to treatment with water soluble acids according to this invention in order to extract the metals and produce the herein contemplated pigment. In such a case, the magnesium or like silicate preferably is prepared as described above by reaction of metal chloride solution containing at least 0.1 pound of sodium chloride per pound of metal chloride.

The surface area of the resulting silica is determined by the pH of the slurry from which it is recovered. Thus, if sufficient acid is added to the calcium silicate to reduce the pH to as low as 2, for example, the silica which is thus obtained has an unusually high surface area. Such a pigment, if recovered from such slurry, would not be suitable for the applicant's purpose. On the other hand, when this slurry is treated with alkali to increase the pH to above 5, the surface area reduces as the pH increases, so that when the pH is 5 or above, the surface area has fallen to approximately 135.

The following example illustrates this principle:

EXAMPLE II

Eight liters of calcium silicate slurry containing 100 grams per liter of calcium silicate, and prepared according to the method described in Example I, was placed in a 12-liter flask fitted with a stirrer. The slurry was heated to 70° C. while being stirred, and then hydrochloric acid solution having a strength of 3.5 normal was added at a rate of 100 milliliters per minute for 12½ minutes. Fifteen minutes after all the acid was added, 3.5 normal sodium hydroxide solution was added to the slurry, with agitation, at a rate of 100 milliliters per minute for 11 minutes. During the addition of the hydrochloric acid and the sodium hydroxide, 100 milliliters of samples of slurry were withdrawn at the time intervals indicated in the table below, and placed in 4-ounce sample bottles which were then closed. These samples were allowed to stand for 3 days. Thereafter, the pH of the slurry samples was measured and the slurries filtered on a 100-milliliter Büchner funnel. The time was noted when the filter cake lost its shine prior to cracking. This time interval was taken as the filtration time.

Following filtration of the slurry, the filter cake was washed with distilled water until free of chloride ions. The washed pigment samples were then dried in an oven at 105° C., ground in a mortar, and the surface area of the samples was measured.

The results obtained are summarized in the following table:

TABLE II
*Acidification, and causticization of calcium silicate slurry*

| Time, minutes | Slurry, pH | Filtration time (minutes and seconds) | Surface area of product (square meters per gram) |
|---|---|---|---|
| 0 | 9.14 | 2' 23'' | 93.4 |
| 1 | 8.98 | 2' 53'' | 92.7 |
| 2 | 8.93 | 2' 30'' | 96.0 |
| 4 | 8.83 | 2' 28'' | 99.3 |
| 6 | 8.72 | 2' 28'' | 105.5 |
| 8 | 8.56 | 3' 4'' | 113.7 |
| 8.5 | 8.51 | 3' 35'' | 119.8 |
| 9 | 8.46 | 2' 41'' | 123.2 |
| 9.5 | 8.35 | 2' 48'' | 124.4 |
| 10 | 8.20 | 2' 53'' | 133.2 |
| 10.5 | 8.10 | 3' 23'' | 132.5 |
| 11 | 7.80 | 2' 54'' | 130.5 |
| 11.5 | 7.33 | 2' 52'' | 135.5 |
| 12 | 6.68 | 3' 30'' | 165.0 |
| 12.5 | 2.41 | 12' 35'' | 506 |

15 minutes' elapsed time

| | | | |
|---|---|---|---|
| 0 | 2.30 | 8' 0'' | 507 |
| .5 | 7.00 | 2' 51'' | 138.2 |
| 1 | 7.57 | 3' 23'' | 130.4 |
| 1.5 | 7.91 | 3' 31'' | 123.7 |
| 2 | 8.15 | 3' 18'' | 126.2 |
| 2.5 | 8.29 | 3' 4'' | 120.0 |
| 3 | 8.47 | 2' 55'' | 120.7 |
| 3.5 | 8.58 | 2' 50'' | 110.6 |
| 4 | 8.76 | 2' 52'' | 105.2 |
| 4.5 | 8.88 | 2' 40'' | 99.6 |
| 5 | 8.97 | 2' 26'' | 99.7 |
| 6 | 9.09 | 2' 21'' | 116.7 |
| 8 | 9.14 | 2' 5'' | 138.2 |
| 10 | 9.22 | 1' 52'' | 186.3 |
| 11 | 9.28 | 52'' | 208.5 |

In the above tests, it will be noted that the pH of the slurry and not of the dried pigment was obtained. In general, it is found that when the dried pigment is slurried in water, the pH thereof is somewhat higher than that of the initial slurry. With slurries having a pH above about 8, this difference is only minor. On the other hand, with slurries having a pH below 8, the pH of the dry pigment, when reslurried, usually is as much as 1 or 2 pH units above that of the pH of the initial slurry.

The above tests clearly indicate the effect of the pH upon the filtering characteristics and also the surface area of the ultimate product. Thus, it is usually desirable to effect the reaction under conditions such that the pH of the slurry prior to filtration is in excess of 5 and to achieve maximum dispersion in rubber the slurry pH should be between about 5 and 7.

The pigments contemplated within the scope of the present invention may be prepared by other methods. For example, the calcium silicate prepared as described above, and/or having the properties described above, may be reacted with an aqueous solution of ammonium chloride. In such a case, the ammonium chloride reacts with the calcium silicate, liberating ammonia and precipitating silica. This process may be practiced according to the methods which have been described in my copending application Serial No. 204,493, filed January 4, 1951. As described in such application, the reaction proceeds according to the following equation:

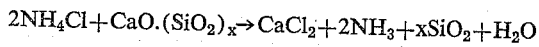

$$2NH_4Cl + CaO.(SiO_2)_x \rightarrow CaCl_2 + 2NH_3 + xSiO_2 + H_2O$$

The reaction of calcium silicate with ammonium chloride may be effected in the manner described in lines 41 through 74 of column 8 of my United States Letters Patent 2,805,955.

Some improvement in pigment properties of silica produced by reaction of calcium silicate with ammonium chloride is obtained when the resulting silica is subjected to the reaction of acid after removal of ammonia is essentially complete. These acids should be capable of forming water soluble compounds with calcium. Typical acids suitable for use are hydrochloric, nitric, acetic, and like acids. Such treatment removes a portion or all of residual calcium, magnesium, iron, aluminum, and other impurities, and thus ensures production of a purer product. Following this acid treatment, it frequently will be advantageous to neutralize excess acidity and to ensure production of a pigment having a pH above 5. The following examples are illustrative:

EXAMPLE III

An aqueous solution of sodium silicate was prepared by diluting 5.88 liters of sodium silicate containing 298 grams per liter of $SiO_2$ as sodium silicate having the composition $Na_2O(SiO_2)_{3.36}$, with sufficient water to produce 20.7 gallons of solution. A further solution was made by dissolving 1220 grams of calcium chloride and 320 grams of sodium chloride in 16.0 gallons of water. Streams of these aqueous solutions were fed directly into the central area of a centrifugal pump, proportioning the rates of flow so that calcium chloride remained in excess over the stoichiometric quantity required for reaction with the sodium silicate at all times. After mixing of the two solutions was complete, 475 grams of ammonium chloride was added to the resulting calcium silicate slurry and the slurry was thereafter boiled for about 4 hours, at which time the odor of ammonia was very faint. Thereafter, the slurry was washed and filtered, and was dried at a temperature of about 120° C. A white friable product having the following composition was produced:

| | Percent by weight |
|---|---|
| Ignition loss | 13.67 |
| $SiO_2$ | 77.84 |
| $R_2O_3$ (iron and aluminum) | 1.30 |
| CaO | 5.88 |
| MgO | 1.36 |

EXAMPLE IV 47.1 liters of sodium silicate solution containing 298 grams per liter of $SiO_2$ as $Na_2O.(SiO_2)_{3.36}$ was diluted to 145 gallons. 87.5 gallons of an aqueous solution containing 10,650 grams of calcium chloride and 2,800 grams of sodium chloride was made up. These solutions were mixed with vigorous agitation as in Example III. The slurry precipitate was washed to remove dissolved chlorides, and an aqueous slurry containing 42.7 grams of calcium silicate per liter of slurry was obtained. Fifty gallons of this calcium silicate slurry was mixed with 23.19 liters of aqueous ammonium chloride solution prepared from the preparation of soda ash according to the Solvay process by reaction of sodium chloride, ammonia, and carbon dioxide, in aqueous solution. This solution contained 160 grams per liter of $NH_4Cl$ and about 20 grams per liter of free ammonia, together with about 70 grams per liter of NaCl.

The resulting mixture was heated to boiling until no further ammonia was given off. Thereafter, the precipitate was filtered, washed, dried, and pulverized. The resulting product is preponderantly $SiO_2$ and is a useful rubber pigment. It was compounded with a GR-S composition according to the following formula:

| | Parts by weight |
|---|---|
| GR-S | 100 |
| Zinc oxide | 5 |
| Sulphur | 3 |
| n-cyclohexyl 2-benzothiazol sulphenamide | 1 |
| Processing oil | 5 |
| Phenyl beta naphthyl amine | 1 |
| Silica as prepared above | 68.2 |

EXAMPLE V

Streams of aqueous sodium silicate solution containing 1 to 2 percent by weight of $Al_2O_3$ and $Fe_2O_3$ and containing 100 grams per liter of $SiO_2$ as $Na_2O(SiO_2)_{3.36}$ and calcium chloride solution containing 100 grams per liter of $CaCl_2$ and 30 to 50 grams per liter of sodium chloride were fed directly into the central area of a centrifugal pump at 150° F.

The rates of flow were adjusted so that calcium chloride was approximately 10 percent in excess over the stoichiometric quantity required for reaction, and so that the amount of liquid supplied to the pump was about 25 percent below the output capacity of the pump. In consequence, the solutions were subjected to turbulent intermixing in the pump.

The slurry of calcium silicate thus produced was introduced into a tank and sufficient hydrochloric acid solution containing 28 percent by weight of HCl was added, with stirring, to reduce the pH of the slurry to 2. Thereupon, sufficient sodium hydroxide solution containing 40 percent by weight of NaOH was added to raise the pH of the slurry to 7.5. The precipitated silica was recovered by decantation and filtration, and was dried in an oven at a drying temperature of 120 to 140° C. for 12 hours. The free water content of the product was within the range of 3 to 8 percent by weight of the pigment.

Products produced according to the above example have the following typical analyses:

TABLE III

| Sample No. | Percent $SiO_2$ | Percent $Al_2O_3$ and/or $Fe_2O_3$ | Percent CaO | Percent Cl | Percent $H_2O$ |
|---|---|---|---|---|---|
| 1 | 82.3 | 1.30 | 1.40 | 0.21 | 16 |
| 2 | 86.5 | 0.73 | 1.18 | | 11.6 |
| 3 | 79.77 | 1.16 | 2.54 | 0.89 | 15.6 |
| 4 | 79.9 | 2.2 | 3.0 | 0.37 | 14.5 |
| 5 | 83.99 | 0.80 | 1.31 | 0.47 | 14.4 |

Percentages in the above table are by weight.

EXAMPLE VI

Twenty-six hundred gallons of sodium silicate solution containing 18 grams per liter of NaCl and 20 grams per liter of $Na_2O$ as the sodium silicate, $Na_2O(SiO_2)_{3.3}$, was placed in a 4000-gallon tank. Carbon dioxide gas containing 10 percent by volume of $CO_2$, the balance being nitrogen, was introduced into the solution over a period of 3 hours while holding the solution at 30° C. at a rate sufficient to react with all the sodium silicate and convert 20–25 percent of the $Na_2O$ content thereof to bicarbonate. Thereafter, the resulting slurry was boiled for one hour, filtered, and washed. The filter cake was reslurried and a solution of $Al_2(SO_4)_3 18H_2O$ in quantity sufficient to introduce into the slurry ½ percent of Al based upon the weight of $SiO_2$ in the slurry was added to the slurry. Thereafter, the slurry was stirred briefly and enough hydrochloric acid was added to adjust the pH to 5.7. The resulting slurry was filtered and the filter cake dried.

It will be understood, also, that the process described above may be performed using ammonium chloride in lieu of hydrochloric acid in order to drive off ammonia and form calcium chloride. The following is a typical example of this process:

EXAMPLE VII

An aqueous solution of sodium silicate was prepared by diluting 5.88 liters of sodium silicate containing 298 grams per liter of $SiO_2$ as sodium silicate having the composition $Na_2O(SiO_2)_{3.36}$ with sufficient water to produce 20.7 gallons of solution. The sodium silicate used also contained 1 to 2 percent by weight of $Al_2O_3$ and $Fe_2O_3$. A further solution was made by dissolving 1220 grams of calcium chloride and 320 grams of sodium chloride in 16.0 gallons of water. Streams of these aqueous solutions were fed directly into the central area of a centrifugal pump, proportioning the rates of flow so that calcium chloride remained in excess over the stoichiometric quantity required for reaction with the sodium silicate at all times. After mixing of the two solutions was complete, 475 grams of ammonium chloride was added to the resulting calcium silicate slurry and the slurry was thereafter boiled for about 4 hours, at which time the odor of ammonia was very faint. Thereafter, the slurry was washed and filtered, and was dried at a temperature of about 120° C. A white friable product having the following composition was produced:

| | Percent by weight |
|---|---|
| Ignition loss | 13.67 |
| $SiO_2$ | 77.84 |
| $Fe_2O_3$ and $Al_2O_3$ | 1.30 |
| CaO | 5.88 |
| MgO | 1.36 |

Alumina-silica pigments of the type herein contemplated may be prepared by treatment of finely divided, precipitated, hydrated silica having an average ultimate particle size of 0.10–0.05 micron, preferably 0.015 to 0.035 micron, with aluminum sulphate or aluminum chloride or the like. The composition of these products depends, of course, upon the amount of aluminum sulphate or aluminum chloride which is used. That is, the more aluminum sulphate used within limits, the more alumina is deposited on the silica. Of course, the limit of alumina which can be picked up by silica of this character depends to a very large degree upon the adsorptive character of the silica. However, concentrations of alumina ranging up to about 4 or 5 percent by weight, based upon the weight of the total solids thus obtained, can be produced. The following is a typical example:

EXAMPLE VIII

Seventeen thousand gallons of a sodium silicate solution is placed in a 50,000-gallon tank. This solution contains the sodium silicate $Na_2O(SiO_2)_{3.3}$ in amount sufficient to establish an $Na_2O$ concentration of 20.3 grams per liter. This solution contains no sodium chloride except that minor amount (less than 0.08 percent) usually present in commercial sodium silicate. The solution is held at a temperature of 167° F.+5°. Carbon dioxide gas containing 10 to 10.8 percent of $CO_2$, the balance being nitrogen and air, is introduced into the solution at a gas temperature of 115 to 145° F. at a rate sufficient to introduce into the solution 1250 cubic feet of the carbon dioxide gas per minute, measured at 760 millimeters' pressure and 0° C. This gas is introduced directly under a turbo agitator in a manner to achieve uniform agitation of the gas. The mixture is vigorously agitated. The carbon dioxide introduction is continued at this rate for 8½ hours, at which time about 120 to 140 percent of the theoretical amount of $CO_2$ has been adsorbed. After this period of 8½ hours, the rate of introduction of carbon dioxide is reduced to 400 cubic feet per minute and the solution is boiled for 1½ hours. The slurry is then washed and the silica is recovered. Five thousand gallons of the slurry prepared as above was washed and the pH of the resulting slurry adjusted to 9.8 and the product was filtered.

One-half of the precipitate was repulped in water to form 1144 gallons of slurry. Twenty-four gallons of hydrochloric acid was added to adjust the pH of the product to 5.6. Thereafter, 4 pounds of lime was added to the solution and the pH of the slurry rose to 6.45. The resulting product was filtered and dried.

The remaining half of the silica was repulped in about the same volume of water and 100 pounds of $$Al_2(SO_4)_3 \cdot 18H_2O$$

was added to the resulting slurry whereupon the pH of the solution fell to 6.9. Enough hydrochloric acid was added to reduce the pH to 5.7. Thereafter, lime was added to raise the pH to 7.

The resulting silicas were compounded in a butadiene-acrylonitrile copolymer according to the following recipe:

| | Parts by weight |
|---|---|
| Hycar OR 25 (a butadiene-acrylonitrile copolymer | 100 |
| Zinc oxide | 5 |
| Siliceous pigment | 58.5 |
| MTBS | 1.5 |
| Methyl Tuads | 0.5 |
| Sulphur | 2.0 |
| Cumarone resin | 12.5 |
| Dibutyl phthalate | 12.5 |
| Stearic acid | 1.5 |
| Agerite | 3 |

The resulting product was vulcanized and subjected to standard tests. The product produced using the silica treated with alum had a tensile strength of about 3500 to 3600 pounds per square inch and a tear of 330 to 350 pounds per inch thickness. In contrast, the tensile strength of the silica in which no alum was present was approximately 3000 pounds per square inch and the tear strength was about 280 to 290 pounds per inch thickness.

The amount of bound water in the above pigments depends upon the temperature and time of drying. Where the temperature is below about 350° C., bound water remains about one mole per 3 to 9 moles of $SiO_2$. Bound water is reduced when the pigment is heated above 350° C., for example, 450 to 800° C., for a sufficient period of time, for example, several hours. Thus, the bound water in a product produced as in Example I is changed from about 4 percent by weight (about one mole of bound water per 6 moles of $SiO_2$) to 0.37 percent by weight (about one mole of bound water per 77 moles of $SiO_2$) by heating at 800° C. for 16 hours. By such heating, products containing as much as 85 moles of $SiO_2$ per mole of bound water can be produced.

As has previously been stated, the above described alumina-silica pigments may be incorporated in rubber in any convenient way and the rubber vulcanized. A typical formulation which is very good for acrylonitrile-butadiene copolymers is that described in Example VIII. The following are others:

A

| | Parts by weight |
|---|---|
| GR–S | 100.0 |
| ZnO | 5.0 |
| Sulphur | 3.0 |
| Phenyl beta naphthylamine | 1.0 |
| Altax | 1.2 |
| Methyl Tuads | 0.15 |
| Cumarone resin | 15.0 |
| Diethylene glycol | 3.5 |
| Alumina-silica pigment | 58.5 |

B

| | |
|---|---|
| Butyl rubber—GR–I–15 | 100.0 |
| Alumina-silica pigment | 39.0 |
| Zinc oxide | 5.0 |
| Tellurac | 1.0 |
| Zenite | 1.0 |
| Sulphur | 2.0 |
| Diethylene glycol | 2.5 |
| Diethylene glycol bis (butoxyethyl carbonate) | 1.0 |

C

| | |
|---|---|
| Natural rubber | 55 |
| GR–S–X478 (cold rubber) | 25.0 |
| Marbon 8000 (high styrene copolymer) | 20.0 |
| Zinc oxide | 5.0 |
| Hi-Sil | 60.0 |
| Iron oxide | 6.0 |
| Wyex | 3.0 |
| Sulphur | 3.0 |
| Altax | 0.2 |
| DOTG | 1.2 |
| Santoflex B | 0.67 |

| | |
|---|---|
| Santoflex 35 | 0.33 |
| Benzoic acid | 0.75 |
| Stearic acid | 3.0 |
| Triethanolamine | 2.0 |

Although the present invention has been described with reference to the specific details of certain embodiments, it is not intended that such details shall be regarded as limitations upon the scope of the invention except insofar as included in the accompanying claims.

This application is a continuation-in-part of my application Serial No. 63,205, filed December 2, 1948 now abandoned; Serial No. 204,493, filed January 4, 1951, now abandoned; Serial No. 283,721, filed April 22, 1952 now United States Letters Patent 2,805,955, granted September 10, 1957, Serial No. 277,760, filed March 21, 1952 now abandoned; Serial No. 443,139, filed July 13, 1954; and Serial No. 471,533, filed November 26, 1954 now United States Letters Patent 2,837,495, granted June 3, 1958.

What is claimed:

1. Finely divided, precipitated, siliceous pigment which contains at least 90 percent by weight of $SiO_2$ measured on the anhydrous basis, bound water in the proportion of 3 to 85 moles of $SiO_2$ per mole of water and a metal oxide of the group consisting of $Al_2O_3$ and $Fe_2O_3$ in the proportion of one mole of said oxide per 40 to 350 moles of $SiO_2$, said pigment being in the form of porous flocs and having an average ultimate particle size of 0.015 to 0.05 micron and a surface area of 75 to 200 square meters per gram.

2. Finely divided, precipitated, siliceous pigment which contains at least 90 percent by weight of $SiO_2$ measured on the anhydrous basis, bound water in the proportion of 3 to 85 moles of $SiO_2$ per mole of water and a metal oxide of the group consisting of $Al_2O_3$ and $Fe_2O_3$ in the proportion of one mole of said oxide per 40 to 350 moles of $SiO_2$, said pigment being in the form of porous flocs and having an average ultimate particle size of 0.015 to 0.05 micron and a surface area of 80 to 180 square meters per gram.

3. Finely divided, precipitated, siliceous pigment which contains at least 90 percent by weight of $SiO_2$ measured on the anhydrous basis, bound water in the proportion of 3 to 85 moles of $SiO_2$ per mole of water, 2 to 10 percent by weight of free water, and a metal oxide of the group consisting of $Al_2O_3$ and $Fe_2O_3$ in the proportion of one mole of said oxide per 40 to 350 moles of $SiO_2$, said pigment being in the form of porous flocs and having an average ultimate particle size of 0.015 to 0.05 micron and a surface area of 75 to 200 square meters per gram.

4. Finely divided, precipitated, siliceous pigment which contains at least 90 percent by weight of $SiO_2$ measured on the anhydrous basis, bound water in the proportion of 3 to 85 moles of $SiO_2$ per mole of water, and a metal oxide of the group consisting of $Al_2O_3$ and $Fe_2O_3$ in the proportion of one mole of said oxide per 40 to 350 moles of $SiO_2$, said pigment being in the form of porous flocs and having an average ultimate particle size of 0.015 to 0.05 micron.

5. Finely divided, precipitated, siliceous pigment which contains at least 90 percent by weight of $SiO_2$ measured on the anhydrous basis, bound water in the proportion of 3 to 85 moles of $SiO_2$ per mole of water, 0.5 to 6 weight percent calcium measured as calcium oxide, and a metal oxide of the group consisting of $Al_2O_3$ and $Fe_2O_3$ in the proportion of one mole of said oxide per 40 to 350 moles of $SiO_2$, said pigment being in the form of porous flocs and having an average ultimate particle size of 0.015 to 0.05 micron and a surface area of 75 to 200 square meters per gram.

6. Finely divided, precipitated, siliceous pigment which contains at least 90 percent by weight of $SiO_2$ measured on the anhydrous basis, bound water in the proportion of 3 to 85 moles of $SiO_2$ per mole of water, 2 to 10 percent by weight of free water, 0.5 to 6 weight percent calcium measured as calcium oxide, and a metal oxide of the group consisting of $Al_2O_3$ and $Fe_2O_3$ in the proportion of one mole of said oxide per 40 to 350 moles of $SiO_2$, said pigment being in the form of porous flocs and having an average ultimate particle size of 0.015 to 0.05 micron and a surface area of 75 to 200 square meters per gram.

7. The pigment of claim 4 wherein the metal oxide is $Al_2O_3$.

8. The pigment of claim 4 wherein the metal oxide is $Fe_2O_3$.

References Cited in the file of this patent

UNITED STATES PATENTS

| | | |
|---|---|---|
| 2,340,728 | Baker et al. | Feb. 1, 1944 |

UNITED STATES PATENT OFFICE
CERTIFICATE OF CORRECTION

Patent No. 2,905,567                        September 22, 1959

Edward M. Allen

It is hereby certified that error appears in the printed specification of the above numbered patent requiring correction and that the said Letters Patent should read as corrected below.

Column 9, line 20, for "0.10-0.05 micron" read -- 0.01-0.05 micron --; line 43, for "167° F.+5°" read -- 167° F.± 5° --.

Signed and sealed this 14th day of June 1960.

(SEAL)
Attest:

KARL H. AXLINE                                    ROBERT C. WATSON

Attesting Officer                                  Commissioner of Patents